(12) United States Patent
Larsen et al.

(10) Patent No.: US 8,152,231 B2
(45) Date of Patent: Apr. 10, 2012

(54) COLLAPSIBLE SEAT AND SYSTEM

(75) Inventors: Lance Larsen, Grand Rapids, MI (US);
David McCarthy, Holland, MI (US);
Sheldon Watjer, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 346 days.

(21) Appl. No.: 12/394,763

(22) Filed: Feb. 27, 2009

(65) Prior Publication Data

US 2009/0218869 A1 Sep. 3, 2009

Related U.S. Application Data

(60) Provisional application No. 61/032,332, filed on Feb. 28, 2008.

(51) Int. Cl.
*A47C 4/00* (2006.01)

(52) U.S. Cl. .................. 297/42; 297/350; 297/452.4

(58) Field of Classification Search .................. 297/42, 297/44, 248, 284.3, 350, 452.4
See application file for complete search history.

(56) References Cited

U.S. PATENT DOCUMENTS

| | | | | |
|---|---|---|---|---|
| 4,385,782 A * | 5/1983 | Clark, Jr. | ................ | 297/440.12 |
| 4,679,848 A * | 7/1987 | Spierings | ................ | 297/230.14 |
| 5,098,157 A * | 3/1992 | Surot | ................ | 297/250.1 |
| 5,366,271 A * | 11/1994 | Johnston et al. | ........... | 297/250.1 |
| 5,676,419 A * | 10/1997 | Kassai | ............. | 297/44 |
| 5,752,738 A * | 5/1998 | Onishi et al. | .................... | 297/61 |
| 6,435,590 B2 * | 8/2002 | Miyahara et al. | ........ | 296/65.11 |
| 7,506,926 B2 * | 3/2009 | Carine | .................... | 297/216.12 |
| 2007/0145789 A1 * | 6/2007 | Linero | ........................ | 297/107 |

* cited by examiner

*Primary Examiner* — David Dunn
*Assistant Examiner* — Philip Gabler
(74) *Attorney, Agent, or Firm* — Fletcher Yoder P.C.

(57) ABSTRACT

Collapsible seats may be installed on a track or rail system to allow the collapsible seats to move laterally within a vehicle's interior. The track system also may permit removal of the collapsible seats from the vehicle. The collapsible seats may include a seat back with multiple sections joined by flexible hinges that permit folding of the seat pan and seat back in a lateral direction. In certain embodiments, the seat pan or the headrest also may include multiple sections joined by flexible hinges. The flexible hinges may allow the seats to collapse laterally to reduce the width of the seats. The available space for seating or cargo storage may be adjusted by selectively collapsing, expanding, and removing the collapsible seats.

16 Claims, 3 Drawing Sheets

COLLAPSIBLE SEAT AND SYSTEM

This application claims priority from and the benefit of U.S. Provisional Application Ser. No. 61/032,332, entitled "COLLAPSIBLE SEAT AND SYSTEM," filed Feb. 28, 2008, which is hereby incorporated by reference.

BACKGROUND

The invention relates generally to collapsible seats and seat systems for vehicles.

For most drivers, vehicles serve many different purposes. While a vehicle is often designed primarily for transporting its driver and passengers, for most vehicles there is also a significant need for transporting cargo and/or storing items. Most vehicles are designed with at least some areas intended to haul cargo and store items, such as, for instance the trunk of a typical sedan. However, an area or a portion of an area that has been designed for either transporting passengers, hauling cargo or storing items, may need to be used for another purpose.

SUMMARY

The present invention relates to a vehicle seating system that includes a rigid base configured to affix a seat to a vehicle, a seat pan supported by the rigid base, a seat back disposed orthogonal to the seat pan and configured to face a foreword or rearward direction of the vehicle, and a plurality of seat back sections configured to move with respect to each other to collapse the seat back in a lateral direction orthogonal to the foreword or rearward direction.

The present invention also relates to a vehicle seating system that includes a rail system disposed in a lateral direction between opposite sides of a vehicle, a rigid base configured to move along the rail system, a seat pan supported by the rigid base and divided into seat pan sections by seat pan living hinges configured to flex to collapse the seat pan in the lateral direction, and a seat back disposed crosswise with respect to the seat pan and divided into seat back sections by seat back living hinges configured to flex to collapse the seat back in the lateral direction.

The present invention further relates to a method that includes forming living hinges in a seat pan to permit folding of the seat pan, forming living hinges in a seat back to permit folding of the seat back, and securing the seat pan and the seat back to a frame configured to be affixed to a vehicle interior. The seat back and the seat pan and configured to fold towards a longitudinal axis of the frame.

DRAWINGS

DETAILED DESCRIPTION

The present disclosure is directed to vehicle seats that may be collapsed to provide flexibility within the interior of a vehicle. For example, the seats may be collapsed to provide additional storage space or to facilitate entry into or egress from a vehicle. The seats also may be removed from the vehicle. In certain embodiments, the seats may be mounted on a track system extending laterally between the sides of the vehicle. The seats may be moved along the track to vary the position of the seats within the vehicle. The lateral movement and collapsibility may allow the position of the seats to be adjusted to accommodate items of various shapes and sizes within the vehicle. Further, the lateral movement may provide increased storage flexibility, particularly when compared to traditional seat storage systems that may fold into the floor of the vehicle. In traditional floor stowage systems, only the space previously occupied by the stowed seat may be available for storage. However, the lateral movement provided by the collapsible seats disclosed herein, may allow customization of the location of the storage space created by collapsing or removing a seat. The lateral movement also may allow the creation of additional storage space while the seat is still located within the vehicle. That way, if the occupancy needs of the vehicle change, the seat can be expanded from the collapsed position and used to transport passengers.

Figure 1:
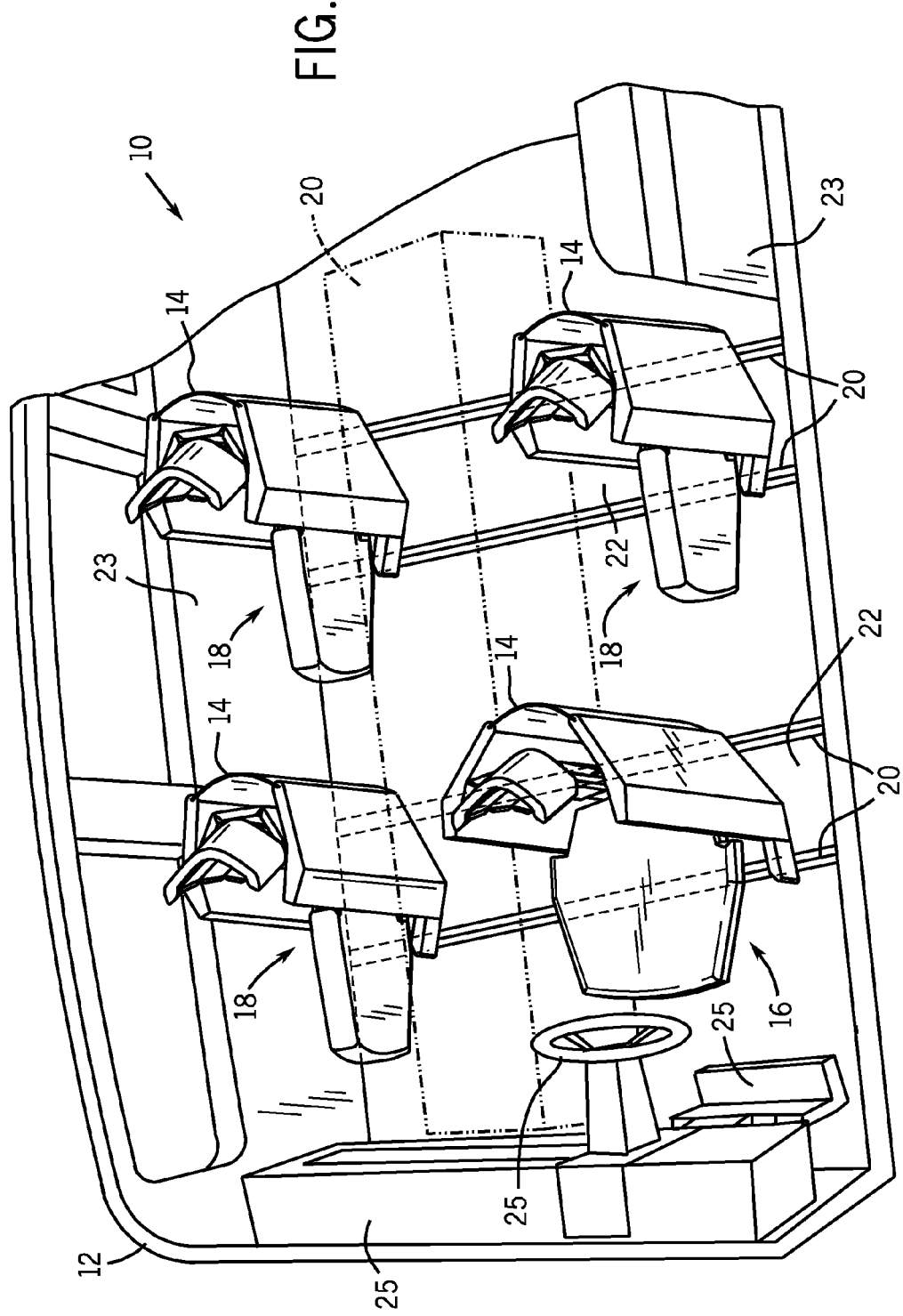
FIG. 1 is a perspective view of an exemplary vehicle that employs collapsible seats.

FIG. 1 depicts an exemplary application for collapsible vehicle seat systems. Such systems, in general, may be applied in a range of vehicles such as automobiles, buses, delivery vehicles, boats, trains, and mass transit systems, among others, that may be used for personal, governmental, or commercial purposes. FIG. 1 depicts the use of the collapsible seat systems within an interior 10 of a vehicle 12. As shown in FIG. 1, interior 10 includes four collapsible seats 14. The driver's seat 14 is in an expanded position 16 to support a driver within the seat 14. The other three seats 14, however, are in a collapsed position 18 to create space for storage of an object 20. When a driver is seated within seat 14, the driver may generally face a foreword direction. However, in other embodiments, the seats may be rotated approximately 180-degrees to face a rearward direction.

Each seat 14 is mounted on a track or rail system 20, attached to a floor 22 of vehicle 10. Track system 20 generally extends along floor 22 between opposite sides 23 of vehicle 10. To create space for object 20, the passenger seats 14 have been collapsed and moved along track system 20 towards sides 23 of vehicle 10, allowing the object 20 to occupy the entire length of interior 10. The sides 23 may be orthogonal to a front 24 of vehicle 10. In certain embodiments, driver controls 25, such as the steering wheel, instrument panel, brake pedal and accelerator pedal, among others, may be attached to track system 20 to allow the controls 25 to move laterally within vehicle 10. For example, the controls 25 may be moved between the right hand and left hand sides of the vehicle to accommodate different countries' driving conventions or to accommodate specialized uses, such as delivering mail.

Various storage configurations may be achieved by selectively switching seats 14 between the expanded position 16 and the collapsed position 18. Further, the seats may be collapsed or expanded at various lateral positions along track system 20. For example, the pair of rear seats may be moved together towards one of the sides 23 or towards the middle. In other embodiments, the track system 20 may extend at various angles with respect to the sides 23 of the vehicle 10 to allow additional seat positions within interior 10. To provide further storage, any number of the seats 14 may be removed from the vehicle 10. For example, the seats may be detached from track system 20 and removed from the vehicle interior 10. In certain embodiments, the seats may be collapsed prior to removal to facilitate egress of seats 14 from vehicle 10. In other embodiments, any number of seats 14 may be included within a vehicle. Further, in certain embodiments, only some of the seats may be collapsible.

Figure 2:
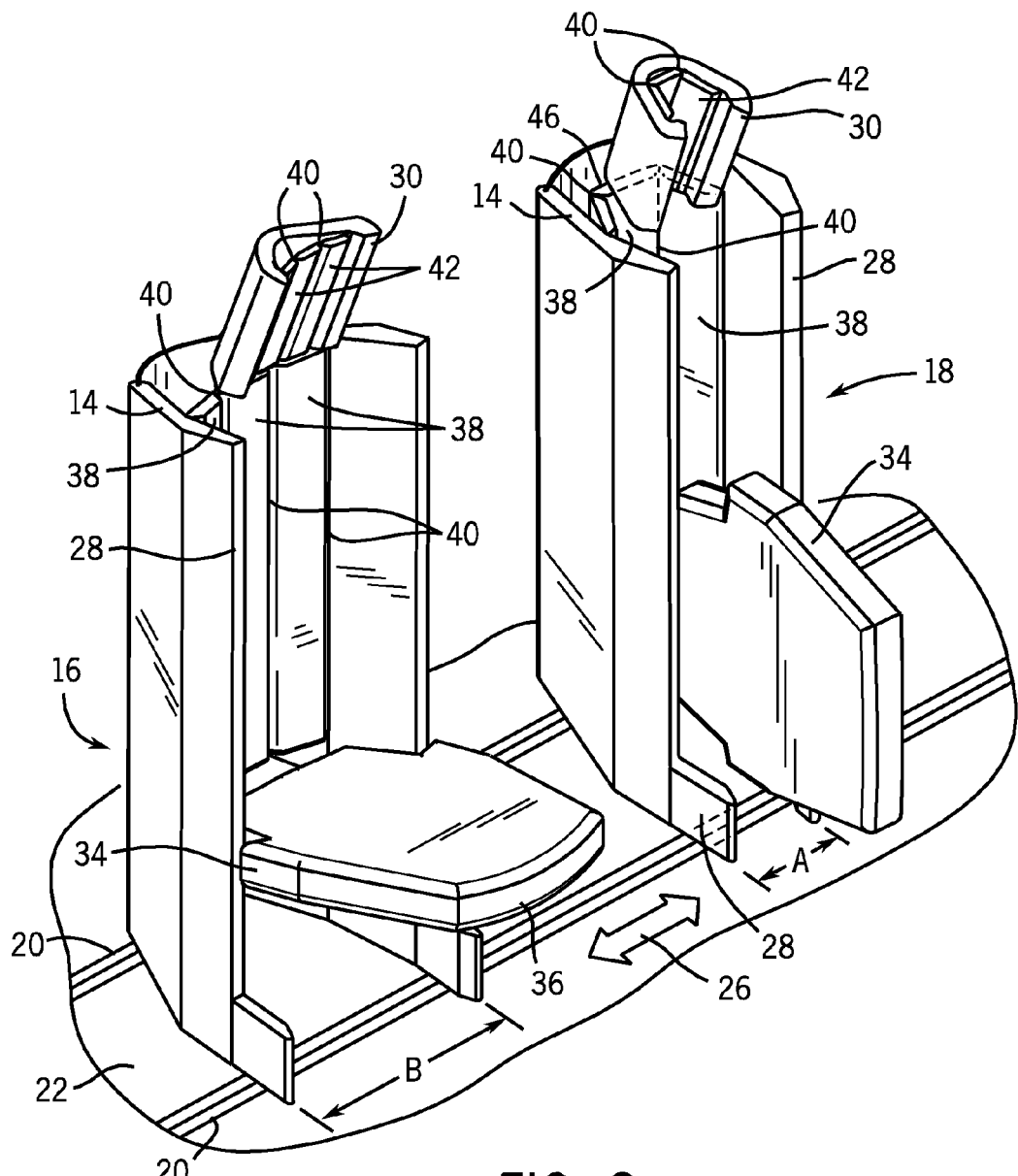
FIG. 2 is a perspective view of one embodiment of a collapsible seat.

FIG. 2 depicts two of the seats 14, one in the expanded position 16, and the other in the collapsed position 18. Seats 14 are mounted on track system 20 and may move along the floor 22 in a lateral direction 26, generally indicated by the arrow. Seat 14 includes a frame 28 that supports a headrest 30, a seat back 32, and a seat pan 34. The frame also may include a rigid base that secured the seat to the track system 20. The frame also may allow the seat back to recline with respect to the seat pan. A handle 36 may be integrated into or affixed to seat pan 34 to facilitate collapse of seat 14. For example, a user may pull and rotate handle 36 to place seat 14 in the collapsed position 18.

Seat back 32 is divided into sections 38 by flexible hinges 40. Each flexible hinge 40 extends between two of the sections 38 or between a section 38 and frame 28. Flexible hinges 40 may be constructed of a flexible material, such as plastic, fabric, or combinations thereof, that may flex multiple times with reduced wear. For example, the flexible hinges may include a plastic substrate that extends between sections and is covered with fabric. In another example, the flexible hinges may include a fabric web extended between the sections. In certain embodiments, the flexible hinges may be integrally molded into the support structure of the seat. However, in other embodiments, the flexible hinges may be sewn, or otherwise affixed to the sections. Further, in certain embodiments, the flexible hinges may be living hinges. The sections may be constructed of foam or other support material and may be covered with fabric or other material. In certain embodiments, the sections may be constructed of a semi-rigid material that provides support for an occupant while seated within the vehicle.

During collapse of the seat 40, flexible hinges may bend or flex to allow sections 38 to fold toward each other to collapsed position 18. The sections may generally fold towards each other along a longitudinal axis of the frame. In certain embodiments, the middle section 38 may remain stationary while the outer sections 38 fold toward each other to become approximately perpendicular to the center section 38. In these embodiments, the flexible hinges 40 that connect the outer sections 38 to frame 28 may allow the outer sections 38 to fold inward to lie upon the inner surface of frame 28. However, in other embodiments, the middle section may move toward the frame or may fold at various angles. Further, any number of sections 38 may be included with flexible hinges 40 joining each section. Further, the flexible hinges 40 may allow sections 38 to extend at various angles from each other and from frame 28.

Headrest 30 also is divided into sections 32 by flexible hinges 40. During collapse of seat 14, flexible hinges may bend or flex to allow sections 32 to fold towards each other, in a manner similar to the folding of the sections 38. To collapse seat 14, a user may pull handle 36 to extend seat pan 34 out from frame 28. A user may then rotate seat pan 34 from a horizontal position, illustrated by the expanded position 16, to a vertical position, illustrated by the collapsed position 18. The seat pan 34 may generally rotate with respect to a rigid base of the frame that may be secured to the track system 20. In certain embodiments, upon rotation of seat pan 34, cables, pulleys, or other mechanisms within frame 28 may cause sections 38 and 42 to fold inward. However, in other embodiments, a user may manually move sections 38 and 42 inward. Frame 28 may move inward along with sections 38 and 42, and may include hinges or other rotational mechanisms to allow frame 28 to follow the movement of sections 38 and 42.

As seen by comparing the expanded position 16 to the collapsed position 18, seat 14 occupies a reduced amount of space when collapsed. Specifically, the seat 14 in the collapsed position 18 has a width A that is smaller than a width B of the seat 14 in the expanded position 16. In certain embodiments, width A may be approximately 1 to 70 percent smaller than width B, as well as all subranges therebetween. More specifically, width A may be approximately 45 to 65 percent smaller than width B.

The extent of the width reduction when seat 14 is in the collapsed position 18 may vary based on a variety of factors. For example, sections 38 and 40 may extend towards each other by various amounts ranging from completely folded together to slightly angled inward. Further, in certain embodiments, sections 42 of the headrest 30 may remain in the expanded position 16, even when seat 14 is collapsed. Moreover, in other embodiments, headrest 30 may be removable or may fold down towards floor 22.

Figure 3:
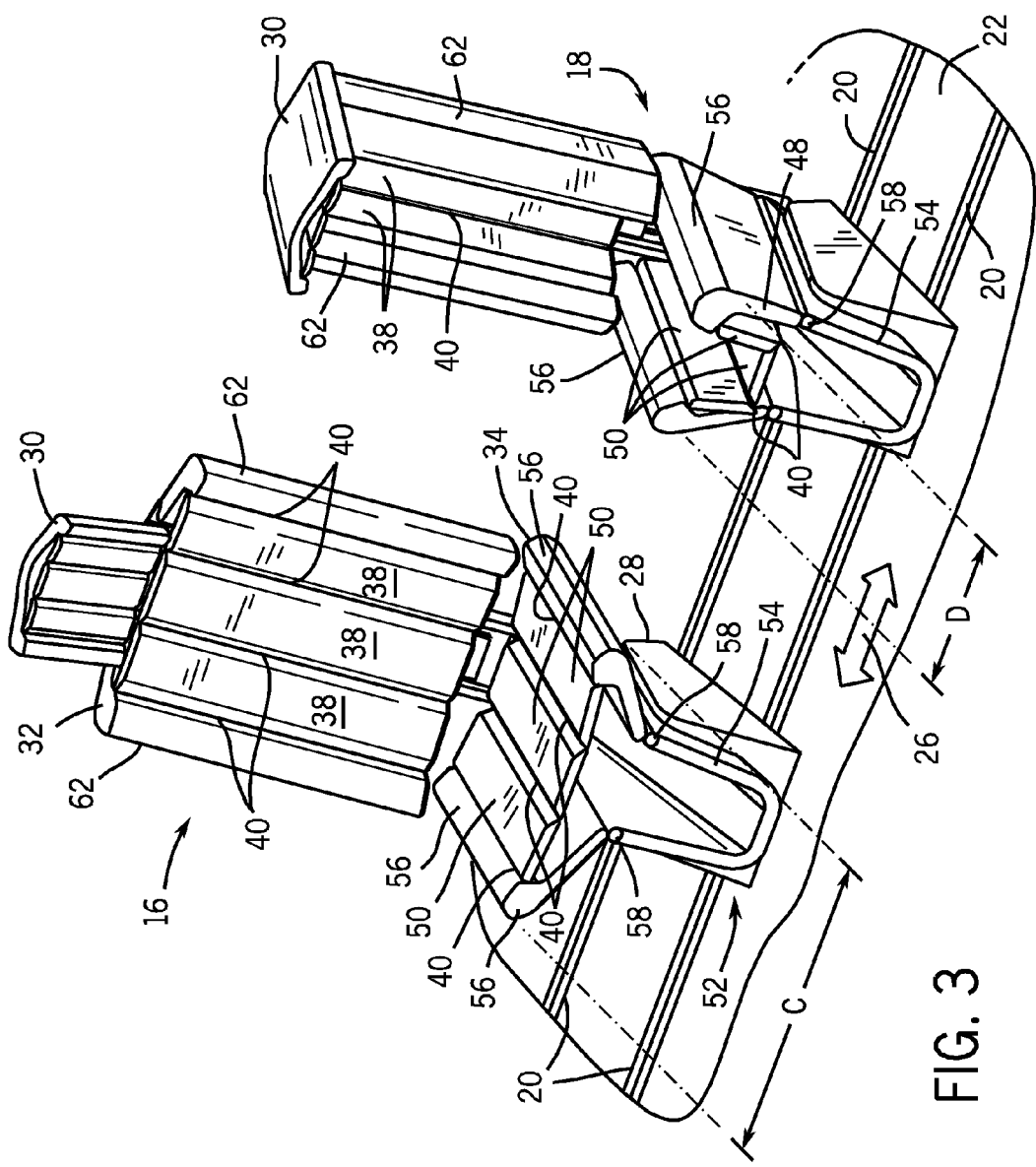
FIG. 3 is a perspective view of another embodiment of a collapsible seat.

FIG. 3 illustrates another embodiment of a collapsible seat 48. Seat 48 includes headrest 30 and seat back 32, which may collapse in a manner described above with respect to FIG. 2. Seat pan 34 is divided into sections 50 by flexible hinges 40. A base 52 supports seat pan 34 and, in certain embodiments, may affix seat 48 to track system 20. Base 52 may be connected to frame 28, which generally supports headrest 30 and seat back 32. Base 52 includes a bottom support 54, as well as side supports 56 extending upwards to connect to seat pan 34. Bottom support 54 may be a rigid support that remains stationary during collapse of seat 14. Flexible hinges 40 may connect side supports 56 to the outer sections 50.

During collapse of seat 48, flexible hinges 40 may flex or bend to allow sections 50 to fold towards each other. Flexible hinges 40 also may allow the outer sections 50 to fold towards side supports 56. Base 52 also may include mechanical hinges 58 that allow side supports 56 to extend upwardly towards each other during collapse of seat 48. As illustrated by the collapsed position 18, sections 50 may be enclosed within base 52 upon collapse of seat 48.

Sections 38 of seat back 32 also may fold towards each other during collapse of seat 48. As described above with respect to FIG. 2, flexible hinges 40 may bend or flex during collapse to allow sections 38 to move towards each other. Frame 28 may include mechanical hinges or other rotation mechanisms that may allow sides 62 to rotate along with sections 38 during collapse of seat 14. The outer sections 38 may be joined to sides 62 of frame 28 by flexible hinges 40. In certain embodiments, flexible hinges 40 may allow the outer sections 30 to move with respect to sides 62 during collapse. As illustrated by the collapsed position 18, after collapse, sections 38 may be enclosed within sides 62 and frame 28. Headrest 30 may fold towards floor 22 to rest on top of seat back 32 and sides 62. However, in other embodiments, headrest 30 may collapse as described above with respect to FIG. 2 or may remain stationary. Upon collapse, the width of seat 48 may be reduced from a width C to a width D. In certain embodiments, width D may be approximately 1 to 70 percent smaller than width C, as well as all subranges therebetween. More specifically, width D may be approximately 45 to 65 percent smaller than width C.

Many configurations of sections connected by flexible hinges may be used within vehicle seats. For example, in certain embodiments, a seat back and seat pan may only include two sections, each joined by a flexible hinge, extending generally along the longitudinal axis of the seat. Any number of sections and flexible hinges may be used within seat backs, seat pans, and headrests to allow collapse of the seats. Further, the number of sections and flexible hinges may vary between the seat back, seat pan, and headrest portions of the seats. Additional components, such as levers, locks, and the like, may be included to secure the seat in the expanded position and/or the collapsed position.

Moreover, in other embodiments, sections may extend outward from the sides of the frame 28 to create additional seating surfaces in between two seats. These sections may be connected together, for example, by interlocking tabs, that can be disengaged to collapse the seats. Upon collapse, the external sections may fold down towards floor 22 to rest against the outer portions of frame 28 or base 52. In other embodiments, the outer sections may fold upward to create a storage space in between the seats.

The invention claimed is:

1. A vehicle seating system, comprising:
   a rigid base configured to affix a seat to a vehicle;
   a seat pan supported by the rigid base;
   a seat back coupled to the seat pan and configured to face a forward or rearward direction of the vehicle; and
   a plurality of seat back sections configured to move with respect to each other to collapse the seat back in a lateral direction generally orthogonal to the forward or rearward direction, wherein the plurality of seat back sections comprises two outer sections each coupled to a side of a frame and configured to rotate toward one another, and wherein the sides of the frame are configured to rotate toward one another in a direction common with the respectively coupled outer section to collapse the seat back in the lateral direction;
   wherein the seat pan comprises a plurality of seat pan sections configured to move with respect to each other to collapse the seat pan in the lateral direction, wherein the rigid base comprises a bottom support and a pair of side supports disposed on opposite sides of the bottom support and each connected to an outer section of the plurality of seat pan sections, and wherein the side supports are configured to rotate upwardly towards one another away from the bottom support to collapse the seat pan in the lateral direction.

2. The vehicle seating system of claim 1, wherein the plurality of seat pan sections are connected to each other by living hinges.

3. The vehicle seating system of claim 1, wherein the seat back is configured to recline with respect to the seat pan.

4. The vehicle seating system of claim 1, comprising a plurality of living hinges each connected to a seat back section of the plurality of seat back sections.

5. The vehicle seating system of claim 1, comprising a track mounted within a floor of the vehicle, wherein the rigid base is configured to slide on the track in the lateral direction.

6. The vehicle seating system of claim 5, wherein the rigid base is removable from the track.

7. A vehicle seating system, comprising:
   a rigid base configured to be disposed between opposite sides of a vehicle;
   a seat pan supported by the rigid base and divided into seat pan sections by seat pan living hinges configured to flex to collapse the seat pan in a lateral direction between the opposite sides of the vehicle, wherein the seat pan sections are enclosed by the rigid base when the seat pan is collapsed in the lateral direction; and
   a seat back disposed crosswise with respect to the seat pan and divided into a plurality of seat back sections by seat back living hinges configured to flex to collapse the seat back in the lateral direction, wherein the plurality of seat back sections comprises two outer sections each coupled to a side of a frame and configured to rotate toward one another, and wherein the sides of the frame are configured to rotate toward one another in a direction common with the respectively coupled outer section to collapse the seat back in the lateral direction;
   wherein the rigid base comprises a static bottom support configured to remain stationary when the seat pan is collapsed in the lateral direction and a pair of side supports disposed on opposite sides of the static bottom support, wherein the side supports are each attached to a separate seat pan section of the plurality of seat pan sections by one of the seat pan living hinges and are each configured to rotate upwardly towards one another away from the static bottom support to collapse the seat pan in the lateral direction.

8. The vehicle seating system of claim 7, comprising a rail system disposed in the lateral direction; wherein the rigid base is configured to move along the rail system to clear a region of an interior of the vehicle.

9. The vehicle seating system of claim 7, wherein at least one of the seat pan living hinges or the seat back living hinges comprises a plastic substrate and a fabric cover disposed over the plastic substrate to secure the at least one living hinge to one of the seat pan sections or one of the seat back sections.

10. The vehicle seating system of claim 7, wherein at least one of the seat pan living hinges or the seat back living hinges comprises a plastic substrate, a fabric material, or a combination thereof.

11. The vehicle seating system of claim 7, wherein the frame sides are each coupled to one of the outer sections by one of the seat back living hinges and each configured to rotate orthogonal to the lateral direction towards the seat pan.

12. The vehicle seating system of claim 7, comprising a headrest aligned with the seat back, wherein the headrest is configured to fold towards the seat pan to abut the seat back and the frame sides when the seat back is collapsed in the lateral direction.

13. The vehicle seating system of claim 12, wherein the headrest is divided into headrest sections by headrest living hinges configured to flex to collapse the headrest in the lateral direction.

14. A method, comprising:
   forming living hinges in a seat pan to permit folding of the seat pan;
   forming living hinges in a seat back to permit folding of the seat back and to divide the seat back into a plurality of seat back sections; and
   securing the seat pan and the seat back to a frame configured to be affixed to a vehicle interior, wherein the seat back and the seat pan and configured to fold towards a longitudinal axis of the frame;
   wherein securing the seat back to the frame comprises coupling outer sections of the plurality of seat back sections to sides of the frame, and wherein the sides of the frame are configured to rotate toward one another in a direction common with the respectively coupled outer section; and
   wherein forming living hinges in the seat pan comprises connecting a plurality of semi-rigid seat pan sections with a flexible material, wherein securing the seat pan to the frame comprising coupling outer sections of the plurality of seat seat pan sections to side supports extending from a static bottom support, and wherein the side supports are configured to rotate upwardly towards one another away from the static bottom support.

15. The method of claim 14, wherein forming living hinges in the seat back comprises affixing a flexible plastic to a semi-rigid section of the seat back.

16. The method of claim 14, wherein forming living hinges in the seat back comprises connecting a plurality of semi-rigid sections with a fabric web.

* * * * *